(12) United States Patent
Flament et al.

(10) Patent No.: US 7,454,964 B2
(45) Date of Patent: Nov. 25, 2008

(54) METHOD FOR DETERMINING EFFORT TRANSMITTED BETWEEN THE WHEEL OF A VEHICLE AND A WHEEL SUPPORT

(75) Inventors: Julien Flament, Greer, SC (US); Patrice Estor, Greer, SC (US); Christophe Egerszegi, Mazaye (FR)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 35 days.

(21) Appl. No.: 10/583,959

(22) PCT Filed: Nov. 26, 2004

(86) PCT No.: PCT/FR2004/003048

§ 371 (c)(1),
(2), (4) Date: Oct. 5, 2006

(87) PCT Pub. No.: WO2005/071385

PCT Pub. Date: Aug. 4, 2005

(65) Prior Publication Data

US 2007/0179679 A1    Aug. 2, 2007

(30) Foreign Application Priority Data

Dec. 26, 2003    (FR) .................................. 03 15440

(51) Int. Cl.
*G01M 17/02* (2006.01)

(52) U.S. Cl. ........................................................ 73/146

(58) Field of Classification Search ........ 73/146–146.8; 340/442–447
See application file for complete search history.

(56) References Cited

U.S. PATENT DOCUMENTS

| 5,003,819 | A | 4/1991 | Koopmann | |
|---|---|---|---|---|
| 6,691,002 | B2 * | 2/2004 | Dormegnie et al. | ............ 701/1 |
| 2002/0111718 | A1 | 8/2002 | Dormegnie et al. | |
| 2004/0065145 | A1 | 4/2004 | Dormegnie et al. | |

OTHER PUBLICATIONS

R.R.Craig, Jr & Mervin C.C. Bampton Coupling Of Substructures For Dynamic Analyses, AIAA Journal (vol. 6 No. 7, Jul. 1968) pp. 1313-1319.

* cited by examiner

*Primary Examiner*—Andre J. Allen
*Assistant Examiner*—Jermaine Jenkins
(74) *Attorney, Agent, or Firm*—Buchanan Ingersoll & Rooney PC (57) ABSTRACT

An effort transmitted between a vehicle wheel and a wheel support is determined by mounting a tire/wheel assembly for rotation on a wheel support having a dynamic hub rigidly connected on a fixed frame such that the only degree of freedom of the assembly is rotation about the hub axis. The tire is pressed against an excitation device and the resulting fixed support effort transmitted between the wheel and the wheel support is measured. On the basis of the measured fixed support effort, there is calculated a suspended support effort which would be transmitted between the wheel and a wheel support having a degree of freedom of suspension in at least one direction (X, Y, Z) in relation to the excitation device.

17 Claims, 4 Drawing Sheets

METHOD FOR DETERMINING EFFORT TRANSMITTED BETWEEN THE WHEEL OF A VEHICLE AND A WHEEL SUPPORT

BACKGROUND OF THE INVENTION

The present invention relates to the field of design and evaluation of ground contact systems for motor vehicles. In particular, the invention relates to a method for determining an effort transmitted between a vehicle wheel and a wheel support, use of this method for determining a transfer function of a vehicle and use of this method for predicting the comfort performance of a vehicle.

WO-A-014589 describes a method for predicting the comfort performance (level of noise and vibration) in the passenger space of a motor vehicle, the wheels of which are equipped with tyres. In this method, a global transfer function is obtained which makes it possible to restore the levels of noise or vibration inside the vehicle passenger space on the basis of efforts measured at the centre of the wheels. This method has the general advantage of making it possible to assess the performance of a prototype tyre-wheel assembly on a given vehicle without having the vehicle available, since the global transfer function of the vehicle has been established by means of a reference tyre-wheel assembly on a rolling means, and this same rolling means is used to measure efforts at the wheel centre of the prototype tyre-wheel assembly. For this measurement, it has been proposed to place the wheel to be fitted on a dynamometric hub with a fixed axis which makes it possible to record the efforts at the centre of the wheel according to three perpendicular directions. The efforts measured at the centre of the wheel are then multiplied by the global transfer function in order to obtain the levels of noise and vibration inside the passenger space, and thus to predict the comfort performance of the vehicle equipped with the prototype tyre-wheel assembly.

SUMMARY OF THE INVENTION

The primary object of the invention is to improve the predictive accuracy of a method of this type. The object of the invention is also to determine a transfer function which takes more accurate account of the response of the vehicle. The object of the invention is also to provide a measurement of the effort transmitted between a wheel of the vehicle and a wheel support which can be used with a transfer function of the vehicle in order to obtain more accurate predictions of its comfort performance.

The invention is based on the finding that the measurement of the efforts at the centre of the wheel on a dynamometric hub with a fixed axis does not take into account the effect of the vehicle suspension on the efforts transmitted by the tyre-wheel assembly to the wheel support. On the basis of this finding, the invention proposes a method which makes it possible to transform a measurement of the efforts transmitted between the wheel and a fixed support into a measurement of the efforts transmitted between the wheel and a suspended support such as that which exists on a motor vehicle.

For this purpose, the invention provides a method for determining an effort transmitted between the wheel of a vehicle and a wheel support, the said method comprising the steps consisting of:

mounting the said wheel pivotably on a wheel support, the said wheel being provided with a tyre;

pressing the said tyre against an excitation means, for example a rolling test drum;

measuring a fixed support effort which is transmitted between the said wheel and the said wheel support when the tyre is excited with the said excitation means, the said wheel support being fixed in at least one direction in relation to the excitation means, characterised by a step consisting in calculating on the basis of the said fixed support effort a suspended support effort which would be transmitted between the said wheel and a wheel support having a degree of freedom of suspension in at least one said direction in relation to the said excitation means.

This method makes it possible to benefit from the simplicity of a measurement of effort on a dynamometric hub with a fixed axis, whilst modelling realistically the forces which are actually liable to be transmitted between the wheel and its support when the latter has one or more degrees of freedom of suspension, as is the case for a vehicle ground contact system. The excitation means can be any device which makes it possible to apply stress to the tread in order to simulate the interaction of the tyre with irregular ground.

Preferably, the said suspended support effort is calculated on the basis of the non-suspended mass of a ground contact system which includes the tyre-wheel assembly and a wheel support which is connected to a suspension device. The non-suspended mass has a global inertia effect which absorbs the high frequencies. This mass can depend on the direction of the degree of freedom of suspension.

According to a particular embodiment of the invention, the said suspended support effort is calculated on the basis of a resonance frequency and/or a shock-absorption coefficient which are characteristic of a specific mode of the ground contact system. This resonance frequency and/or this shock-absorption coefficient can depend on the direction of the degree of freedom of suspension.

Preferably, the said suspended support effort is calculated on the basis of a rigidity and/or an absorption of the said suspension device. This rigidity and/or this absorption can depend on the direction of the degree of freedom of suspension.

Advantageously, the suspended support effort is calculated on the basis of a rigidity and/or an absorption of the said tyre. This rigidity and/or this absorption can depend on the direction of the degree of freedom of suspension.

According to another particular embodiment of the invention, the said suspended support effort is calculated on the basis of a resonance frequency and/or a shock-absorption coefficient which are characteristic of a specific mode of the said tyre. This resonance frequency and/or this coefficient of absorption can depend on the direction of the degree of freedom of suspension.

Advantageously, the said suspended support effort is also calculated on the basis of a parameter of coupling between the said specific mode of the tyre and a displacement of the wheel centre. This coupling parameter can depend on the direction of the degree of freedom of suspension.

Preferably, the said suspended force effort is calculated in the frequential domain by multiplying the said fixed support effort by a passage matrix.

According to a particular embodiment of the invention, the said passage matrix is diagonal when the said efforts are expressed in a reference corresponding to the main directions of the vehicle. The main directions of the vehicle are the horizontal rolling direction, the lateral horizontal direction and the vertical direction.

It will be appreciated that the dimension of the passage matrix depends on the number of effort components to be calculated. For a single effort component, it is possible to use a single coefficient of the matrix, i.e. a scalar passage function.

Advantageously, at least one diagonal coefficient of the said passage matrix has development which decreases globally above a certain frequency. A globally decreasing development of this type translates the inertia of the non-suspended mass of the ground contact system.

Preferably, at least one diagonal coefficient of the passage matrix has a peak at the level of a resonance frequency of the ground contact system.

Advantageously, at least one diagonal coefficient of the said passage matrix has, on a portion of the spectrum, an adjacent minimum and maximum which represent frequential offsetting of a specific mode of the tyre.

The invention also provides use of the above-described effort determination method in order to determine a transfer function of a vehicle equipped with a ground contact system which includes a wheel support connected to a body by means of a suspension device and a reference tyre-wheel assembly which is fitted on the said wheel support, characterised by the steps consisting of:

measuring a level of noise and/or vibration inside the vehicle when the tyre of the said reference tyre-wheel assembly is excited in specific rolling conditions;

implementing the method for determination of effort with the said reference tyre-wheel assembly excited in rolling conditions which are determined such as to calculate the said suspended support effort as effort transmitted between the said reference tyre-wheel assembly and the said wheel support of the ground contact system;

determining the said transfer function in the frequential domain between the said level of noise and/or vibration measured and the said effort calculated. Rolling conditions mean at least one parameter selected from the group constituted by the geometry of the excitation deformation, its spectrum, the load withstood by the tyre-wheel assembly, the speed of rotation of the tyre-wheel assembly and the inflation pressure of the tyre.

The invention also provides use of the above-described effort determination method in order to predict the comfort performance of a vehicle to be equipped with a ground contact system which includes a wheel support connected to a body by means of a suspension device and a prototype tyre-wheel assembly which is fitted on the said wheel support, characterised by the steps consisting of:

implementing the method for determination of effort with the said prototype tyre-wheel assembly in order to calculate the said suspended support effort as effort transmitted between the said prototype tyre-wheel assembly and the said wheel support of the ground contact system; and multiplying the said effort calculated by a transfer function of the said vehicle in the frequential domain in order to obtain a level of noise and/or vibration predicted in the interior of the vehicle.

Preferably, the said transfer function is determined by use of the above-described effort determination method.

The invention also provides a data processing device, characterised in that it comprises calculation means which are programmed to implement a functional suspension model which, on the basis of a fixed support effort signal representing an effort transmitted between a wheel support which is fixed in at least one direction relative to an excitation means and a vehicle wheel which is fitted pivotably on the said wheel support and is provided with a tyre which is pressed against the said excitation means, can calculate a suspended support effort signal representing an effort which would be transmitted between the said wheel and a wheel support having a degree of freedom of suspension in at least one said direction relative to the said excitation means.

The invention also provides a computer programme comprising instruction codes which can be read or stored on a support and can be executed by a computer in order to implement a functional suspension model which, on the basis of a fixed support effort signal representing an effort transmitted between a fixed wheel support in at least one direction relative to an excitation means and a vehicle wheel which is fitted pivotably on the said wheel support and is provided with a tyre which is pressed against the said excitation means, can calculate a suspended support effort signal representing an effort which would be transmitted between the said wheel and a wheel support having a degree of freedom of suspension in at least one said direction relative to the said excitation means.

BRIEF DESCRIPTION OF THE DRAWINGS

The invention will be better understood, and other objects, details, characteristics and advantages of it will become more apparent, from the following description of several particular embodiments of the invention, provided purely by way of non-limiting illustration, with reference to the attached drawings. In these drawings.

DETAILED DESCRIPTION OF A PREFERRED EMBODIMENT

Figure 1:
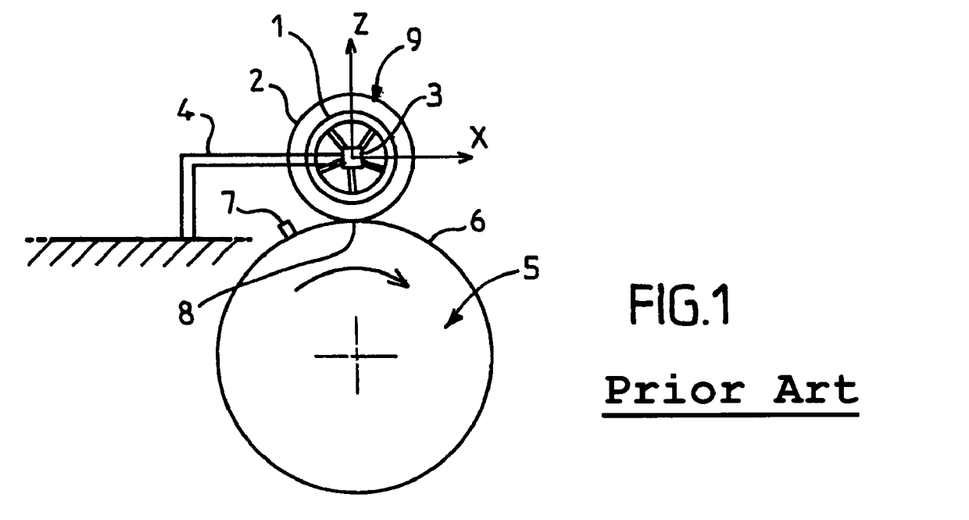
FIG. 1 is a schematic representation of a method for measuring the effort transmitted between a wheel and its support, according to the prior art.

FIG. 1 represents a measuring tool according to the prior art for measuring efforts transmitted between a wheel 1 which is provided with a tyre 2 and its wheel support. The wheel support is a hub 3 which has a rotary axis oriented in a direction Y which is perpendicular to the plane of the figure, and is connected rigidly to a fixed frame 4. Thus, the only degree of freedom of the wheel 1 is rotation around the axis of the hub 3. The hub 3 is a dynamometric hub which makes it possible to record the efforts at the centre of the wheel 1, i.e. the efforts transmitted between the wheel 1 and the hub 3, in the three perpendicular directions X, Y and Z. The frame 4 makes it possible to apply a given load to the wheel 1 in order to compress the tyre 2 against a test drum 5 which can be rotated around its axis parallel to the direction Y. The peripheral surface 6 of the test drum 5 is provided with an obstacle 7 in order to generate vibrations in the tyre 2 by deforming its contact area 8, when the tyre-wheel assembly 9 constituted by the wheel 1 and the tyre 2 is rotated by the test drum 5.

The measurements recorded with this tool do not take perfectly into account the efforts which are generated at the wheel centre in a motor vehicle ground contact system, since, in this case, the wheel support is not connected to a fixed frame, but is connected to the vehicle body by means of a suspension device which has degrees of freedom. Many suspension structures are known. FIG. 1 of WO-A-0104589 provides a non-limiting example of them.

In order to improve the prediction of the efforts which are generated at the wheel centre in a motor vehicle ground contact system, the inventors of the present application have had the idea of determining how the efforts which the tyre generates on a fixed wheel support are modified when the wheel support is suspended in relation to the body of a vehicle, and to calculate a passage function which allows the transition to be made from the result of a measurement made with the tool in FIG. 1, to an estimate of the effort at the wheel centre, taking into account the effect of the suspension. For this purpose, a functional suspension model has been used. This model is schematised in FIGS. 2 to 4. Thanks to its different parameters, this model can characterise substantially any type of suspension.

Figure 2:
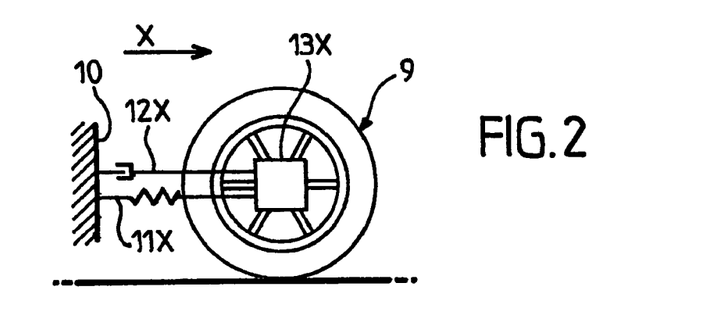
FIGS. 2 to 4 represent a functional model of a suspension interposed between a wheel and the body of a vehicle.
Figure 3:
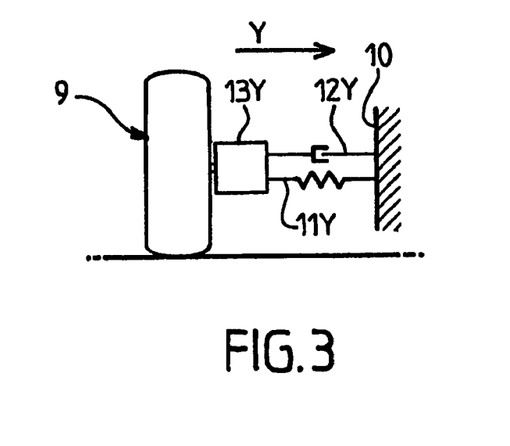
Figure 4:
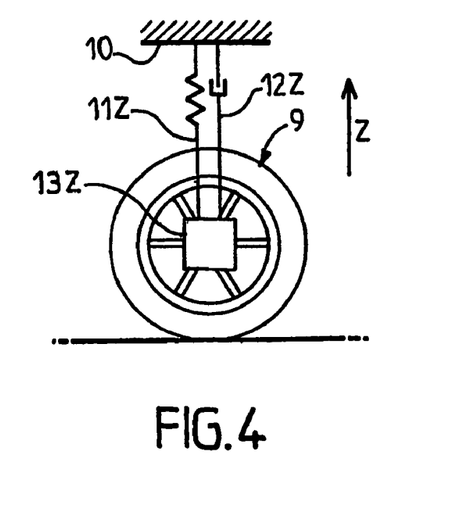

FIGS. 2 to 4 show that the tyre-wheel assembly 9 is connected to a frame 10, representing the body which is assumed to be fixed, of the vehicle, in each case by a spring 11$i$ in parallel with a shock absorber 12$i$ (i=X,Y,Z) according to each of the three directions X, Y and Z. Thus, the suspension creates three degrees of freedom of translation for the wheel support. The tyre-wheel assembly 9 is allocated an additional mass 13 situated at the wheel centre, which represents a partial mass of the suspension which is added to the wheel mass and to a partial mass of the tyre in order to form the non-suspended mass $M_{NS}$ which is applied to the wheel centre during dynamic movements.

Figure 9:
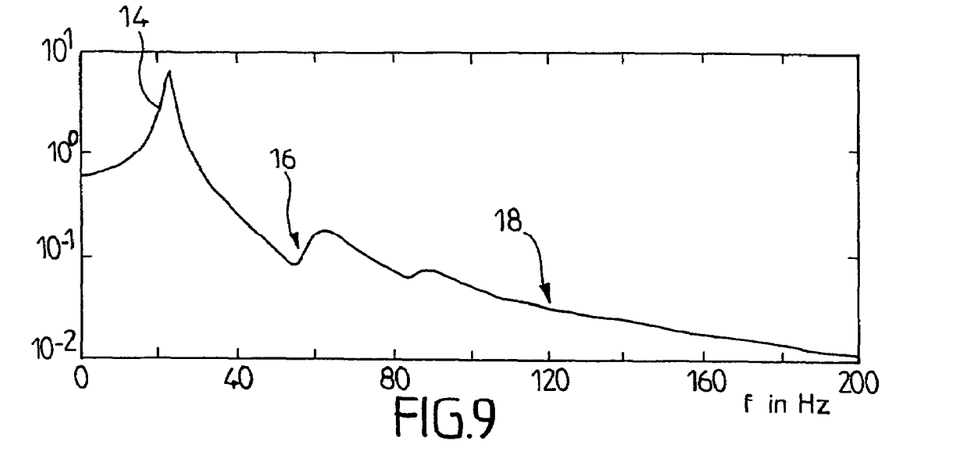
FIGS. 9 to 12 are graphs representing passage functions obtained by numerical simulation.
Figure 10:
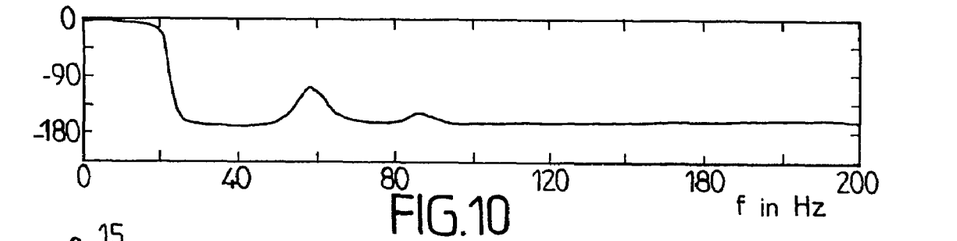
Figure 11:
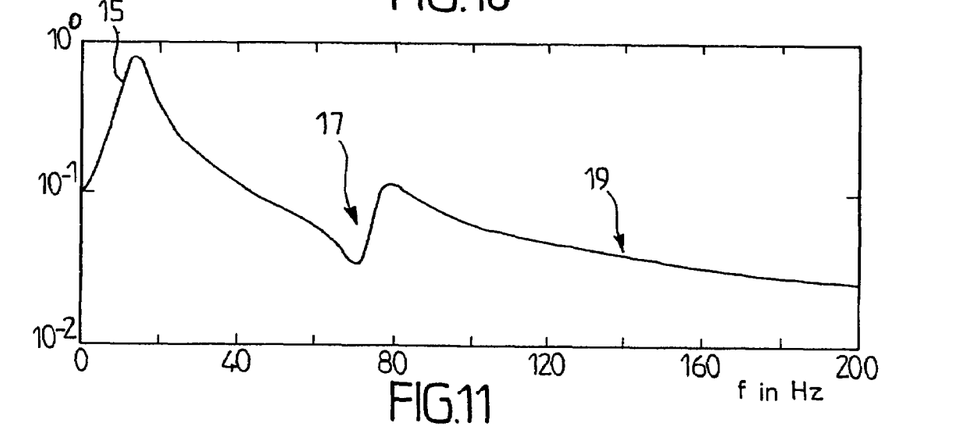
Figure 12:
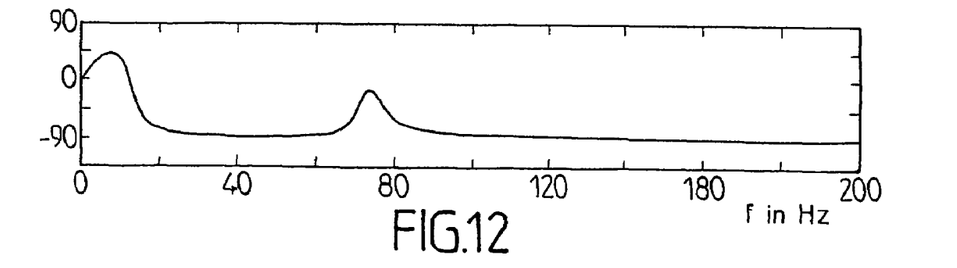

Initially, a comparison was made by numerical simulation of the behaviour of the tyre-wheel assembly 9 fitted onto a fixed support (FIG. 1) and of the tyre-wheel assembly 9 fitted onto a suspended support (FIGS. 2 to 4), the wheel always being free to rotate around its axis. By means of a detailed sub-structured dynamic model of the tyre and a method of finite elements, determination was made of the effort components $F_i^{SF}$ in the direction i (i=X, Z) at the wheel centre with a fixed wheel support, in response to exciting harmonic deformation with an excitation pulse ω applied at the area of contact of the tyre. Then, for the same exciting deformation, by means of a detailed sub-structured dynamic model of the tyre and suspension and a method of finite elements, determination was made of the effort components $F_i^{SS}$ in the direction i (i=X, Z) at the wheel centre with a suspended wheel support. FIGS. 9 to 12 represent results of this numerical simulation. More specifically, FIGS. 9 and 10 represent respectively the amplitude (on a non-dimensional logarithmic scale) and the phase (in degrees) of the complex passage function $H_{XX}$ defined by the ratio:

$$H_{XX}(\omega) = \frac{F_X^{SS}(\omega)}{F_X^{SF}(\omega)}$$

and FIGS. 11 and 12 represent respectively the amplitude and phase of the complex passage function $H_{ZZ}$ defined by the ratio:

$$H_{ZZ}(\omega) = \frac{F_Z^{SS}(\omega)}{F_Z^{SF}(\omega)}$$

On the x-axis, the frequency f is defined by ω=2πf.

These results make it possible to ascertain substantially three effects of the suspension on the efforts transmitted at the wheel centre:

- the appearance of new specific vibratory modes represented by the peaks 14 and 15 on the amplitude curves, corresponding to resonant modes of the non-suspended mass in the direction concerned, typically of approximately 15 to 20 Hz;
- interaction between these specific modes and the specific vibratory modes of order 1 of the tyre, the resonance frequency of which is modified. In particular, the portion of curve 16 in FIG. 9 and the portion of curve 17 in FIG. 11 respectively have a minimum followed immediately by a maximum, which translates the increase in the resonance frequency of the specific mode R0.5 and the specific mode R1.0 of the tyre respectively;
- a global inertia effect, i.e. an input impedance effect, which depends on the non-suspended mass applied to the wheel centre, and reduces globally the effort transmitted to the wheel support and accelerates the decrease in the effort transmitted when the frequency increases, as represented by the portions of curve 18 and 19 in FIGS. 9 and 11;
- beyond approximately 100 Hz, there is no longer any significant difference in behaviour between the wheel with a fixed support and the wheel with a suspended support.

Figure 6:
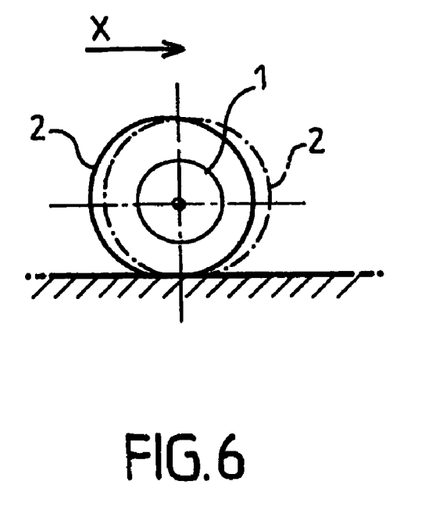
FIGS. 6 to 8 represent vibration modes specific to a tyre.
Figure 7:
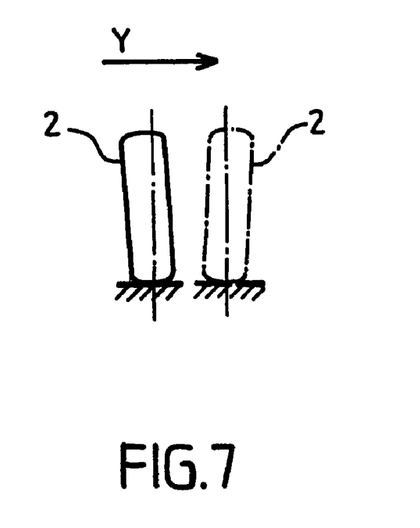
Figure 8:
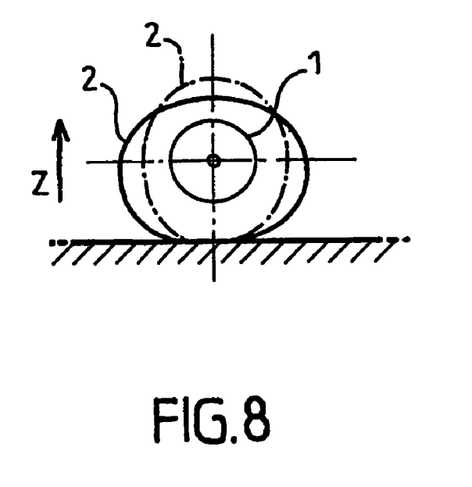

Thus, it is found that the suspension adds specific modes of resonance of the non-suspended masses to a settling inertia effect of the effort transmitted to the wheel centre, and offsets certain specific modes of the tyre. In fact, the offset modes are modes of order 1 which are linked significantly to the displacement of the wheel centre. These modes of order 1 which are well known to persons skilled in the art are represented schematically in FIGS. 6 to 8, for the sake of clarity. FIG. 6 represents two extreme positions of the tyre 2, oscillating in the mode R0.5, which is the mode of order 1 in the direction X. The wheel 1 is fixed. FIG. 7 represents two extreme positions of the tyre 2, oscillating in the mode T0.5, which is the mode of order 1 in the direction Y. FIG. 8 represents two extreme positions of the tyre 2, oscillating in the mode R1.0, which is the mode of order 1 in the direction Z.

It will be noted that the effort $F^{SS}$ transmitted to the wheel centre represents with good approximation the effort which is transmitted between the suspension units and the body of the vehicle.

An explanation will now be given of the analytical expressions of the passage functions previously introduced, in order, on the basis of the effort measurements with a fixed wheel support, and without resorting to complex and costly numerical simulation, to determine what measurements would be obtained with a suspended wheel support.

In its general form, the passage matrix between the efforts transmitted by the wheel to a fixed wheel support and the efforts transmitted by the wheel to a suspended wheel support, known as H, is a 5*5 matrix, since in each case the efforts comprise three translation components and two rotation components, the wheel being assumed to be free to rotate around its axis parallel to the direction Y. The passage matrix is based on a model with the ground contact system which includes a functional tyre model and a functional suspension model.

The tyre forms the basis of sub-structured modelling of the Craig-Bampton type (R. R. Craig, M. C. C. Bampton: "Coupling of Substructures for Dynamic Analysis", AIAA Journal, Vol. 6, July 1968). The sub-structured equation produced for the tyre is as follows:

$$\left( \begin{bmatrix} \Omega_{II}^2 & 0 & 0 \\ 0 & K_{CC} & K_{CA} \\ 0 & K_{CA}^T & K_{AA} \end{bmatrix} + j \begin{bmatrix} H_{II} & H_{IC} & H_{IA} \\ H_{IC}^T & H_{CC} & H_{CA} \\ H_{IA}^T & H_{CA}^T & H_{AA} \end{bmatrix} - \omega^2 \begin{bmatrix} I_{II} & M_{IC} & M_{IA} \\ M_{IC}^T & M_{CC} & M_{CA} \\ M_{IA}^T & M_{CA}^T & M_{AA} \end{bmatrix} \right) \begin{pmatrix} \alpha_I \\ u_C \\ u_A \end{pmatrix} = \begin{pmatrix} 0 \\ F_C \\ F_A \end{pmatrix}$$

in which the variables K designate matrices of rigidity, the variables H designate matrices of shock absorption, the shock absorption being assumed to be purely hysteretic, and the variables M designate matrices of mass; the indices I, C and A designate respectively the degrees of modal freedom of the wheel centre and of the area of contact of the tyre; $u_A$ designates a displacement vector of the area of contact of the tyre; $u_C$ designates a displacement vector of the wheel centre, $F_A$ designates a vector of effort received by the tyre at the area of contact of the tyre, and $F_C$ designates a vector of effort received by the tyre at the wheel centre, i.e. the opposite of the effort transmitted by the wheel to the wheel support.

The matrices $K_{CC}$ and $H_{CC}$ represent rigidity and shock absorption which associate the displacement of the wheel centre with an effort at the wheel centre. In other words, the dynamic rigidity of the tyre is modelled, in each direction i (i=X,Y,Z), as a spring 21i put in parallel with a hysteretic shock absorber 22i between the wheel 1 and the ground, as schematised in FIG. 5 (direction X not shown).

In order to establish the expression of the effort $F^{SF}$ transmitted by the wheel to a fixed support, account is taken of the degrees of freedom which are fixed, i.e. $u_c$=0 is imposed.

In order to establish the expression of the effort $F^{SS}$ transmitted by the wheel to a suspended support, a simplified linear suspension model is introduced, as schematised in FIGS. 2 to 4, which takes into account the degrees of freedom which are no longer fixed and represents the springs, shock absorbers, resilient articulations and other resilient units of the suspension. The effort $F^{SS}$ thus depends on the displacement of the wheel centre, which is no longer zero, according to the formula:

$$F^{SS} = [K_S + jH_S + j\omega C_S] u_C$$

where $K_S$ is a rigidity matrix, $H_S$ is a hysteretic shock-absorption matrix, and $C_S$ is a viscous shock-absorption matrix of the suspension.

The suspension model also comprises a suspension mass matrix at the centre of the wheel, known as $M_S$, and the $M_{NS}$ indicates the total non-suspended mass matrix at the centre of the wheel, i.e.:

$$M_{NS} = M_S + M_{CC}$$

It is assumed that the deformation of the tyre in the contact area is the same on the fixed support and on the suspended support. This therefore provides a general expression of the passage matrix:

$$H(\omega) = [K_S + jH_S + j\omega C_S] \begin{bmatrix} K_{CC} + jH_{CC} + K_S + jH_S + j\omega C_S - \\ \omega^2 M_{NS} - (jH_{IC}^T - \omega^2 M_{IC}^T) \dots \\ (\Omega_{II}^2 + jH_{II} - \omega^2 1_{II})^{-1} (jH_{IC} - \omega^2 M_{IC}) \end{bmatrix}^{-1}$$

For use in a method for predicting the comfort performance of a motor vehicle with a global transfer function, this expression has been simplified by the following considerations:

The determination of the efforts of translation of the wheel centre is sufficient, thus making it possible to reduce the passage matrix H to the dimension 3.

It was found that the extra-diagonal terms could be left out of account, since in general there are two orders of magnitude of difference between a diagonal term and the extra-diagonal terms for each line of the matrix H.

The matrices of rigidity, shock absorption and mass for the tyre and for the suspension are considered to be diagonal.

The terms of the matrix H relating to the specific modes of the tyre other than the aforementioned modes of order 1 are left out of account, since it was found that only these modes of order 1 were affected significantly by the suspension.

The terms $H_{IC}$ of coupling between specific modes of the tyre and interface at the wheel centre were left out of account.

The shock absorption of the suspension was considered to be purely hysteretic in the directions X and Y.

The shock absorption of the suspension in the direction Z was considered to be purely hysteretic if the shock absorber was fixed (suspension spring movement too slight to make the shock absorber function), or purely viscous if the shock absorber is not fixed.

It is assumed that the tyre does not have either any rigidity or shock absorption in the direction X, because of the freedom of rotation of the wheel 1.

EXAMPLE 1

On the basis of the above hypotheses, the three passage functions, i.e. the diagonal terms of the passage matrix H are obtained in the frequential domain in the form:

$$H_{XX}(\omega) = \frac{K_S^X + j \cdot H_S^X}{K_S^X + j \cdot H_S^X - \omega^2 M_{NS}^X - \omega^4 \frac{m_{X_{I+z\leftrightarrow r0.5}}^2}{\omega_{r0.5}^2 + 2j\xi_{r0.5}\omega_{r0.5}\omega - \omega^2}}$$

$$H_{YY}(\omega) = \frac{K_S^Y + j \cdot H_S^Y}{K_{Y_{rx}Y_{rZ}} + K_S^Y + j \cdot H_{Y_mY_m} + j \cdot H_S^Y - \omega^2 M_{NS}^Y - \omega^4 \frac{m_{Y_{rx}\leftrightarrow Y0.5}^2}{\omega_{Y0.5}^2 + 2j\xi_{Y0.5}\omega_{Y0.5}\omega - \omega^2}}$$

$$H_{ZZ}(\omega) = \frac{K_S^Z + j \cdot H_S^Z + j\omega \cdot C_S^Z}{K_{Z_{rx}Z_{rx}} + K_S^Z + j \cdot H_{Z_{rx}Z_{rx}} + j \cdot H_S^Z + j\omega \cdot C_S^Z - \omega^2 M_{NS}^Z - \omega^4 \frac{m_{Z_{rx}\leftrightarrow R1.0}^2}{\omega_{R1.0}^2 + 2j\xi_{R1.0}\omega_{R1.0}\omega - \omega^2}}$$

The notations are as follows:

$K_S^i$ designates the rigidity (in N/m) of the spring 11i (i=X, Y,Z). $H_S^i$ designates the hysteretic shock absorption (in N/m) of the shock absorber 12i (i=X,Y,Z).

$C_S^Z$ designates the viscous shock absorption (in N/m) of the shock absorber 12Z.

$M_{SN}^i$ designates a diagonal coefficient of the total non-suspended mass (i=X,Y,Z), in kg.

$\zeta_k$ and $\omega_k$ designate in each case the shock absorption (in N/m) and the pulsing (in rad/s) associated with a specific mode k of order 1 of the tyre.

$m_{i \leftrightarrow k}$ designates in each case a coupling mass in kg$^{1/2}$, between a degree of freedom i of the wheel centre and a specific mode k of the tyre.

Figure 5:
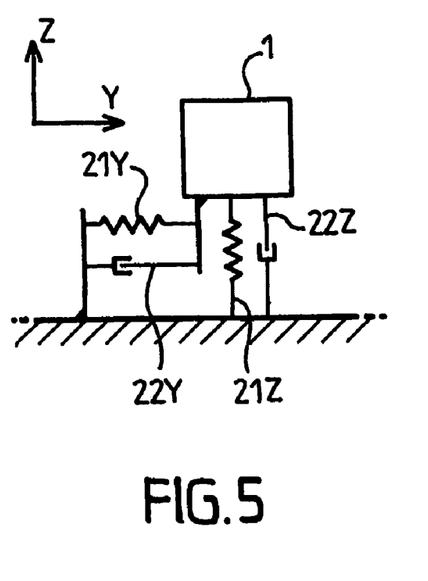
FIG. 5 represents a simplified functional model of a tyre.

$K_{iCRiCR}$ designates the rigidity (in N/m) of the spring 21$i$ (i=Y,Z) representing the tyre.

$H_{iCRiCR}$ designates the hysteretic shock absorption (in N/m) of the shock absorber 22$i$ (i=X,Y,Z) representing the tyre.

j is the complex number $j^2=-1$.

Figure 13:
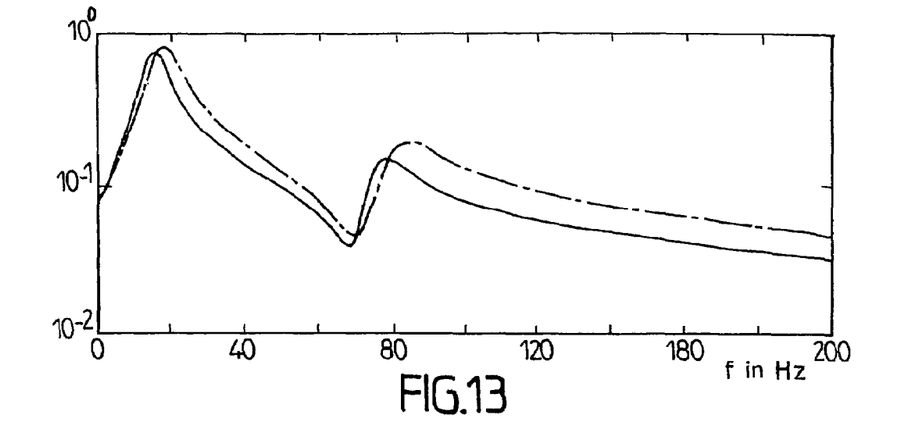
FIGS. 13 and 14 are graphs representing the amplitude and phase of a coefficient of a passage matrix obtained by analytical modelling on the one hand, and by experimental measurement on the other hand.
Figure 14:
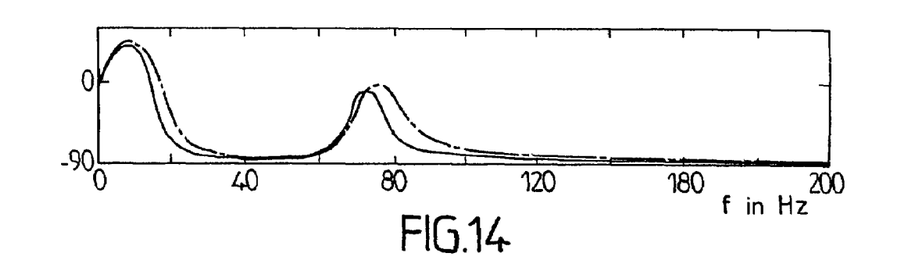

FIGS. 13 and 14 represent an example of comparison of the passage function $H_{ZZ}$ calculated according to the expression in the example 1, represented in a continuous line, and the same function measured experimentally, represented as a dot-and-dash line. FIG. 13 represents the amplitude of the passage function on a non-dimensional logarithmic scale, and FIG. 14 represents its phase in degrees. It is found that the phenomena which had been identified by means of the numerical simulation, i.e. occurrence of a specific mode at low frequency, offsetting of the specific mode of order 1 of the tyre, and settling of the response at high frequency, are confirmed experimentally, and are quite accurately modelled by the analytical expression in example 1. This result is important, since the analytical expression of the passage function is based on quite a low number of parameters, which can be measured and adapted according to the ground contact system which is being studied.

The specific modes of the non-suspended masses substantially have the following as their own frequency:

$$2\pi \sqrt{\frac{K_S^i}{M_{NS}^i}}$$

EXAMPLE 2

The expression in example 1 can be simplified if no account is taken of the cross-terms such as the coupling masses $m_{i<->k}$. This simplification does not detract significantly from the result. In example 2, the expression of the passage functions is similar to that in example 1, the coupling masses $m_{i<->k}$ being replaced by constants which are adjusted empirically.

EXAMPLE 3

The expression in example 1 can be simplified by leaving out of account the effect of the suspension on the specific modes of the tyre. The expression of the passage functions is then:

$$H_{XX}(\omega) = \frac{K_S^X + j \cdot H_S^X}{K_S^X + j \cdot H_S^X - \omega^2 M_{NS}^X}$$

$$H_{YY}(\omega) = \frac{K_S^Y + j \cdot H_S^Y}{K_S^Y + j \cdot H_S^Y - \omega^2 M_{NS}^Y}$$

$$H_{ZZ}(\omega) = \frac{K_S^Z + j \cdot H_S^Z + j\omega \cdot C_S^Z}{K_{Z_{rx}Z_{rx}} + K_S^Z + j \cdot H_S^Z + j\omega \cdot C_S^Z - \omega^2 M_{NS}^Z}$$

This expression takes into account the resonance of the non-suspended masses and the input impedance caused by the suspension between the tyre and the body.

EXAMPLE 4

The expression in example 3 can be simplified further if no account is taken of the effect of resonance of the non-suspended masses. The expression of the passage functions is then:

$$H_{ii}(\omega) = \frac{-c_i}{\omega^2 M_{NS}^i}$$

where $c_i$ is a constant which is adjusted empirically. In this case, simply taking into account the non-suspended masses makes it possible to perceive the input impedance of the vehicle suspension device.

In the different examples cited, the expressions of the passage functions bring into play the parameters which characterise the tyre and the suspension. The methods for determining these different parameters are now described.

Determination of the Non-suspended Masses

When a vehicle equipped with suspension and a tyre-wheel assembly is available, it is possible to use the double-weighting method. The first resonant mode of the ground contact system is excited by means of a dynamometric test bench, and its resonance frequency $f_1$ is measured. Then, an additional mass known as $M_a$ is secured to the wheel centre, and this measurement is recommenced. The resonance frequency $f_2$ is offset according to the formula:

$$\frac{f_2}{f_1} = \sqrt{\frac{M_{NS}}{M_{NS} + M_a}}$$

from which $M_{NS}$ is deduced.

In addition, it is considered that there are three contributions to the non-suspended mass $M_{NS}$, i.e. a contribution by the suspension $M_s$ which is the suspension mass which is perceived at the wheel centre and can be dependent on the direction, a contribution by the wheel, which is its total mass $M_R$ for all directions, and a contribution by the tyre $M_{iCR}$ (i=X,Y,Z) which is the mass of the tyre which is perceived at the wheel centre, and can be dependent on the direction.

The contribution by the tyre $M_{iCR}$ has been established statistically according to the total mass of the tyre $M_{tyre}$ and the moment of inertia of the wheel $I_{wheel}$ when the latter rotates freely around its axis:

$$M_{X_{CR}} = 1.4176 M_{tyre} + 10.2851 I_{wheel} + 0.9738$$

$$M_{Y_{CR}} = 0.51776 M_{tyre} + 0.86549$$

$$M_{Z_{CR}} = 0.79283 M_{tyre} - 0.43756$$

Thus, once the non-suspended mass $M_{NS}$ has been measured by double weighting, weighting of the wheel and tyre makes it possible to determine the contribution specific to the suspension:

$$M^i_S = M^i_{NS} - M_{wheel} - M_{iCR}$$

The contribution by the suspension must be retained together with the other characteristic data of the vehicle (values for rigidity and suspension shock absorption), since this is useful when it is necessary to estimate the non-suspended masses corresponding to a new tyre-wheel assembly fitted on the same suspension, without having the vehicle and suspension available. In this case, a new weighting is carried out of the new wheel and new tyre, the contribution by the tyre is calculated by means of the above formulae, and the contribution by the suspension is added, which is not modified. Advantageously, it is assumed that the contribution by the suspension is isotropic.

Determination of the Static Rigidities and Hysteretic Shock Absorptions of the Tyre These parameters $K_{iCRiCR}$ and $H_{iCRiCR}$ should preferably be determined in rolling conditions, and not at a standstill. They are obtained conventionally by means of a dynamometric test bench which makes it possible to measure the efforts at the wheel centre in response to displacements imposed in frequency and in amplitude at the area of contact of the tyre. It is possible for example to use a dynamometric hub with the brand name MTS (Mechanical Testing & Simulation) made by the company MTS Systems Corporation.

Determination of the Frequencies and Shock Absorptions of the Specific Modes of the Tyre These parameters $\zeta_k$ and $\omega_k$ are obtained by means of a known modal analysis method for the tyre. In principle, vibrations are excited in the tyre, for example by means of hammers, and the resulting vibratory signals are recorded, for example by means of accelerometers. The measurements can be made on a dynamometric hub with the brand name MTS, using standard signal processing tools, for example a signal processing module with the brand name LMS made by the company LMS International.

Determination of the Rigidities and Shock Absorptions of the Suspension

These parameters $H_S$, $K_S$, and $C_S$ are measured on a vehicle equipped with suspension which must be modelled, and by means of a dynamic test bench, for example with the MTS brand name. A vibratory plate gives rise to displacements, at the frequency and amplitude set, at the area of contact of the tyre. Laser sensors record the displacements of the wheel centre. Effort sensors simultaneously record the efforts transmitted by the suspension to the vehicle body. The complex rigidity of the suspension in each direction is derived immediately from the ratio between the effort transmitted and the corresponding displacement of the wheel centre.

Determination of the Coupling Masses

A statistical model has been developed, on the hypothesis that the coupling masses $m_{i<->k}$ which represent the ease with which displacement of the wheel centre in the direction i excites a specific mode k of the tyre, are correlated to the other characteristic parameters of the specific mode, i.e. its frequency $f_k$, its shock absorption $\zeta_k$ and the static rigidity $K_{iCRiCR}$ in the direction concerned. This model provides the coupling masses in the form:

$$M_{X_{CR}<->r0.5} = 0.10907 M_{tyre} - 0.05173 f_{r0.5} + 0.64065 \zeta_{r0.5} + 3.391 \cdot 10^{-6} K_{Z_{CR}Z_{CR}} + 3.1505$$

$$M_Y CR_{<->T0.5} = 0.0361 M_{tyre} - 8.9815 \cdot 10^{-4} f_{T0.5} + 0.43591 \zeta_{T0.5} + 0.60877$$

$$M_Z CR_{<->R1.0} = 0.041869 M_{tyre} - 4.4036 \cdot 10^{-3} f_{R1.0} + 0.69036 \zeta_{R1.0} + 9.9969 \cdot 10^{-7} K_{Z_{CR}Z_{CR}} + 0.68727$$

Use of Passage Functions to Determine a Global Transfer Function

Figure 15:
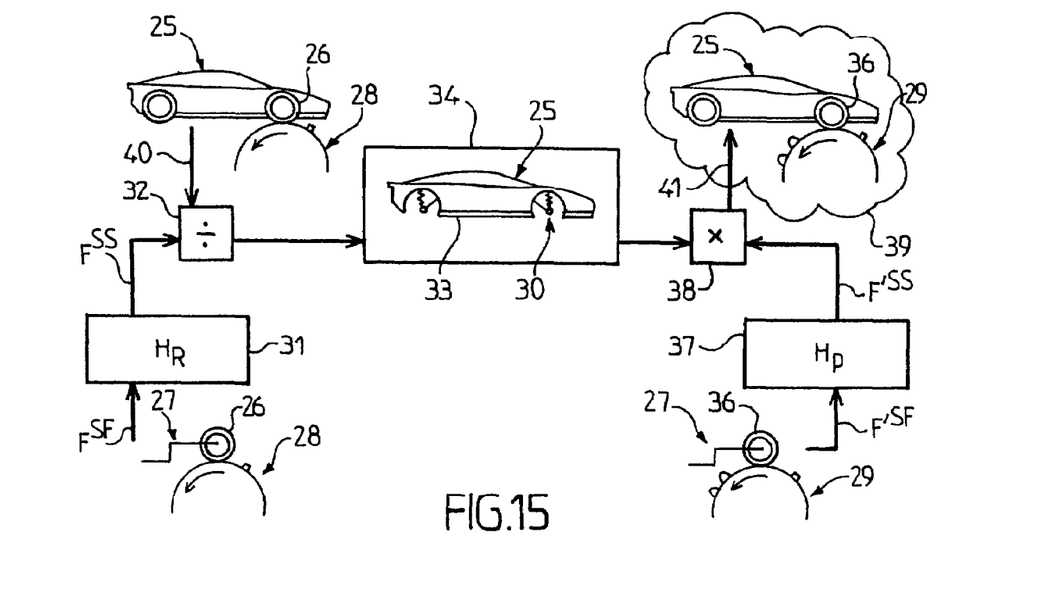
FIG. 15 is a block diagram representing a method for prediction of the comfort performance of a vehicle by means of a global transfer function.

FIG. 15 shows a vehicle 25, the global transfer function of which is to be determined. The vehicle 25 is provided with a ground contact system including a suspension 30 and a reference tyre-wheel assembly 26 in the front right location. The procedure takes place in several steps:

a) using a test drum 28 which is provided with an obstacle, the reference tyre-wheel assembly 26 is subjected to vibratory excitation in specific rolling conditions (inflation pressure, speed, static charge), which can be fixed or variable. During this time, measurement is made of the vibratory and acoustic values inside the passenger space, in order to characterise the level of comfort perceived by the passengers.

The corresponding measurement signals 40 are converted into the frequential domain by Fourier transformation.

b) for the same reference tyre-wheel assembly 26 and the same rolling conditions, measurements are made of the efforts at the wheel centre using a dynamometric tool 27 with a fixed support, similar to the tool represented in FIG 1. The same test drum 28 provided with the same obstacle is activated under the same conditions as in step a). The corresponding measurement signals $F^{SF}$ are converted into the frequential domain by Fourier transformation.

c) determination is carried out of the passage matrix $H_R$, which is assumed to be diagonal, corresponding to the ground contact system constituted by the suspension or wheel support 30 and the reference tyre-wheel assembly 26, after having measured the necessary parameters.

d) in the step 31, there is calculation of the product of this passage matrix by means of the fixed support efforts measured in step b), which provides an estimation $F^{SS}$ of the efforts actually transmitted between the reference tyre-wheel assembly 26 and its wheel support 30 in the vehicle ground contact system.

e) in the step 32, transfer function calculations are carried out, by calculation of coherence between the signals recorded in the passenger space in step a) and the efforts calculated in step d), all in the frequential domain, which expresses the ratio between the vibratory and acoustic levels recorded in the passenger space and the efforts transmitted between the front right wheel and its support at the wheel centre, which efforts give rise to these vibratory and acoustic levels. These calculations are carried out using conventional signal processing tools, for example the software with the brand name Matlab or LMS. This transfer function, which is schematised by the block 34, characterises the aptitude of the body 33 and the suspension 30 of the vehicle 25 to transmit vibrations between the front right wheel support and the passenger space, independently from the tyre-wheel assembly which is attached to it. In practice, this transfer function has as many components as there are different signals measured in step a). The transfer function calculation is in itself well-known in the state of the art: schematically, it involves division of different inter-spectra and auto-spectra between one another.

In practice, the steps a) to e) can be repeated with the other three wheels of the vehicle 25, in order thus to obtain a function of global transfer of the vehicle which characterises the aptitude of the body 33 and the suspension 30 of the vehicle 25 to transmit vibrations between each wheel support and the passenger space.

The global transfer function acts as a tool to predict the comfort performance of the vehicle 25 when its wheels are modified.

Use of the Passage Functions in Order to Predict the Performance of a Prototype Tyre-wheel Assembly The problem is posed of predicting the manner in which the vibratory and acoustic levels will be affected in the passenger space of the vehicle if the reference tyre-wheel assembly 26 is replaced by a prototype tyre-wheel assembly 36. The procedure takes place in several steps:

f) for the prototype tyre-wheel assembly 36, the efforts at the wheel centre are measured by means of the fixed-support dynamometric tool 27, which is similar to the tool represented in FIG. 1, and using a test drum 29 which is provided with an obstacle or another appropriate relief. The prototype tyre-wheel assembly 36 is thus subjected to vibratory excitation in the rolling conditions determined (inflation pressure, speed) for which it is wished to predict the vibratory and acoustic levels in the passenger space of the vehicle. During the measurement, a static load is applied to the prototype tyre-wheel assembly 36, which corresponds to the load which it would receive if it were fitted in the front right position of the vehicle 25. The corresponding measurement signals $F'^{SF}$ are converted into the frequential domain by Fourier transformation.

g) after having measured the necessary parameters of the prototype tyre-wheel assembly 36, there is determination of the passage matrix $H_p$, which is assumed to be diagonal, corresponding to the front right quarter of the ground contact system for the prototype tyre-wheel assembly 36. In this step, it is not necessary to have available the suspension 30, the characteristic parameters of which will previously have been saved.

h) in the step 37, there is calculation of the product of the passage matrix and the efforts measured with a fixed support in step f), which provides an estimation $F'^{SS}$ of the efforts which would actually be transmitted between the prototype tyre-wheel assembly 36 and the front right hub carrier in the vehicle ground contact system 25.

i) in the step 38, there is calculation of the product of the efforts estimated in the step h) and the transfer function 34 obtained in the step e), or optionally a corresponding transfer function obtained according to the prior art. This calculation provides a predictive estimate 41 of the vibratory and acoustic values which would be measured in the interior of the passenger space by carrying out the measurements schematised by the block 39 with the vehicle 25 equipped with the prototype tyre-wheel assembly 36. The clear advantage of this method is that it dispenses with having to carry out the measurements schematised by the block 39, these measurements being predicted by the calculation, without needing to bring together physically the vehicle and the prototype tyre-wheel assembly 36. This results in a saving of time and flexibility in the studies which precede the manufacture of a complete vehicle.

In the step f), the relief of the test drum 29 can be the obstacle which is used in the steps a) and b) for establishment of the transfer function or any other vibratory surfacing. In practice, the steps f) to i) can be repeated for the three other wheel positions of the vehicle 25, in each case using the passage matrix and the transfer function which is associated with this wheel position.

The passage matrix makes it possible to calculate the efforts transmitted between the wheel and its suspended support on the basis of measurement of the efforts transmitted between the wheel and its fixed support, in identical rolling conditions. The use of this passage matrix in order to determine the transfer function of the vehicle (step d) and to predict the comfort performance of the vehicle (step h) improves considerably the quality of the predictions in relation to the prior art. Using an analytical formulation of the passage matrix makes it possible to model very easily different tyre-wheel assemblies and different suspensions, in a manner which is far more economical than carrying out each time a complete numerical simulation involving finite elements. In this case, it is sufficient each time to measure and adapt the few characteristic parameters which are involved in the modelling of the tyre-wheel assembly and the suspension.

In the step g), it is possible to modify the suspension parameters in order to study from a qualitative point of view the manner in which the vibratory and acoustic levels will be affected in the passenger space of the vehicle, if the suspension is also modified. Only minor modifications can be studied in this manner, since it is then assumed that the transfer function of the vehicle and the deformation of the contact area of the tyre are not modified.

In the steps d) and h), use is made of a computer of the PC type, which has an input signal in order to enter the measurement signal produced by the dynamometric tool 27, and which is programmed to apply the passage matrix to this measurement signal. The programming of the computer is preferably based on the analytical formulation of the example 1. The programming also comprises a parameterisation function of the passage matrix which allows the user to enter the characteristic parameters of the tyre-wheel assembly and of the suspension, for example by means of scrolling menus on the screen. These parameters are preferably stored in the form of parameterisation files in a predetermined format which assures the standardisation and portability of the parameterisation data. The other calculation steps, in which there is determination or use of the vehicle transfer function, are also carried out using a computer, which can be the same one.

The expressions of the passage matrix previously described are not exhaustive, and the method described for modelling the vehicle quarter will allow persons skilled in the art to derive formulations which are more or less defined, according to the required level of accuracy, for example by taking into account the non-diagonal terms.

In the claims the indefinite article "one" allocated to a certain element or step does not exclude the presence of a plurality of elements or steps which have the characteristics described.

Although the invention has been described in association with several particular embodiments, it will be appreciated that it is in no way limited to this, and that it comprises all the technical equivalents of the means described, as well as their combinations, if these come within the scope of the invention.

The invention claimed is:

1. Method for determining an effort transmitted between a vehicle wheel and a wheel support, the method comprising the steps of:
   mounting the wheel for rotation on a wheel support comprising a dynamic hub rigidly connected on a fixed frame such that the only degree of freedom of the wheel is rotation about the hub axis, the wheel being provided with a tyre forming therewith a tyre-wheel assembly;
   pressing the tyre against an excitation means;
   measuring a fixed support effort which is transmitted between the wheel and the wheel support when the tyre is excited by the excitation means, and
   calculating, on the basis of the measured fixed support effort, a suspended support effort is transmitted between the wheel and a wheel support having a degree of freedom of suspension in at least one direction (X, Y, Z) in relation to the excitation means.

2. Method according to claim 1, characterised in that the suspended support effort is calculated on the basis of the non-suspended mass of a ground contact system which includes the tyre-wheel assembly and a wheel support which is connected to a suspension device.

3. Method according to claim 2, characterised in that the suspended support effort is calculated on the basis of a resonance frequency and/or a shock-absorption coefficient which are characteristic of a specific mode of the ground contact system.

4. Method according to claim 2 or claim 3, characterised in that the suspended support effort is calculated on the basis of a rigidity and/or a shock-absorption of the suspension device.

5. Method according to claim 1 or claim 2, characterised in that the suspended support effort is calculated on the basis of a rigidity and/or a shock-absorption of the tyre.

6. Method according to claim 1 or claim 2, characterised in that the suspended support effort is calculated on the basis of a resonance frequency and/or an absorption coefficient which are characteristic of a specific mode of the tyre.

7. Method according to claim 6, characterised in that the suspended support effort is also calculated on the basis of a parameter of coupling between the specific mode of the tyre and a displacement of the wheel centre.

8. Method according to claim 1 or claim 2 characterised in that the suspended force effort is calculated in the frequential domain by multiplying the fixed support effort by a passage matrix.

9. Method according to claim 8, characterised in that the passage matrix is diagonal when the efforts are expressed in a reference corresponding to the main directions (X,Y,Z) of the vehicle.

10. Method according to claim 9, characterised in that at least one diagonal coefficient of the passage matrix has development which decreases globally above a certain frequency.

11. Method according to claim 9, characterised in that at least one diagonal coefficient of the passage matrix has a peak at the level of a resonance frequency of the ground contact system.

12. Method according to claim 9 characterised in that at least one diagonal coefficient of the passage matrix has, on a portion of the spectrum, an adjacent minimum and maximum which represent frequential offsetting of a specific mode of the tyre.

13. Use of the method according to claim 1 or claim 2 in order to determine a transfer function of a vehicle equipped with a ground contact system which includes the wheel support connected to a vehicle body by means of a suspension device and a reference tyre-wheel assembly which is fitted on the said wheel support, comprising the steps of:
measuring a level of noise and/or vibration inside the vehicle when the tyre of the reference
tyre-wheel assembly is excited in specific rolling conditions;
implementing the method with the reference tyre-wheel assembly excited in the rolling conditions which are determined such as to calculate the suspended support effort as effort transmitted between the reference tyre-wheel assembly and the wheel support of the ground contact system;
determining a transfer function in a frequential domain between the level of noise and/or vibration measured and the effort calculated.

14. Use of the method according to claim 1 or claim 2 in order to predict the comfort performance of a vehicle to be equipped with a ground contact system which includes a wheel support connected to a vehicle body and a prototype tyre-wheel assembly which is fitted on the said wheel support, comprising the steps of:
implementing the method with the prototype tyre-wheel assembly in order to calculate the suspended support effort as effort transmitted between the prototype tyre-wheel assembly and the wheel support of the ground contact system; and
multiplying the effort calculated by a transfer function of the said vehicle in the frequential domain in order to obtain a level of noise and/or vibration foreseen in the interior of the vehicle.

15. Use according to claim 14, characterised in that the transfer function is determined by use according to claim 13.

16. Data processing device, comprising an interface to enter a fixed support effort signal representing a measured effort transmitted between a wheel support and a vehicle wheel which is mounted for rotation on the wheel support and is provided with a tyre pressed against excitation means, the wheel support being fixed such that the only degree of freedom of the wheel is about its own axis, and calculation means programmed to implement a functional suspension model which, on the basis of the fixed support effort signal, calculates a suspended support effort signal representing an effort is transmitted between the wheel and a wheel support having a degree of freedom of suspension in at least one said direction relative to the excitation means.

17. Computer programmed comprising instruction codes which can be read or stored on a support and can be executed by a computer in order to implement a functional suspension model which, on the basis of a fixed support effort signal representing an effort transmitted between a fixed wheel support and a vehicle wheel which is mounted rotatably on the wheel support such that the only degree of freedom of the wheel is rotation about its own axis and is provided with a tyre pressed against the excitation means, calculates a suspended support effort signal representing an effort is transmitted between the wheel and a wheel support having a degree of freedom of suspension in at least one direction X, Y, Z relative to the excitation means.

* * * * *